(12) United States Patent
Park et al.

(10) Patent No.: US 9,166,220 B2
(45) Date of Patent: *Oct. 20, 2015

(54) NEGATIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(75) Inventors: Sang-Eun Park, Yongin-si (KR); Young-Ugk Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 619 days.

This patent is subject to a terminal disclaimer.

(21) Appl. No.: 13/551,548

(22) Filed: Jul. 17, 2012

(65) Prior Publication Data

US 2013/0209883 A1    Aug. 15, 2013

Related U.S. Application Data

(60) Provisional application No. 61/598,188, filed on Feb. 13, 2012.

(51) Int. Cl.
| | |
|---|---|
| *H01M 4/134* | (2010.01) |
| *H01M 4/13* | (2010.01) |
| *H01M 4/04* | (2006.01) |
| *H01M 4/36* | (2006.01) |
| *H01M 4/48* | (2010.01) |
| *H01M 10/0525* | (2010.01) |

(52) U.S. Cl.
CPC ............ *H01M 4/0471* (2013.01); *H01M 4/049* (2013.01); *H01M 4/364* (2013.01); *H01M 4/483* (2013.01); *H01M 10/0525* (2013.01); *Y02E 60/122* (2013.01)

(58) Field of Classification Search
None
See application file for complete search history.

(56) References Cited

U.S. PATENT DOCUMENTS 7,903,990 B2    3/2011   Bessho
7,919,205 B2 *  4/2011   Kogetsu et al. ............... 429/128
(Continued)

FOREIGN PATENT DOCUMENTS

EP    1 986 253 A1    10/2008
JP    2009-020274     1/2009
(Continued)

OTHER PUBLICATIONS

Patent Abstracts of Japan, and English machine translation of Japanese Publication 2011-051844 listed above, (12 pages).
(Continued)

*Primary Examiner* — Cynthia K Walls
(74) *Attorney, Agent, or Firm* — Christie, Parker & Hale, LLP

(57) ABSTRACT

According to an embodiment of the present invention, a negative active material for a rechargeable lithium battery includes silicon oxide particles represented by $SiO_x$ (where $0<x<2$) in which an atom % of a silicon phase decreases in a concentration gradient according to a depth from the surface of each particle to the center of the particle, and has an atom % of an O phase that increases in a concentration gradient. In the atom % concentration graph of the silicon (Si) phase according to the depth, the integral value of the atom % concentration of the silicon (Si) phase from the surface (where the depth is 0) to a depth where the concentration of the silicon (Si) phase is 55 atom % is about 5000 to about 40000 nm·atom %.

21 Claims, 14 Drawing Sheets

(56) References Cited

U.S. PATENT DOCUMENTS

| | | | |
|---|---|---|---|
| 7,943,254 B2 | 5/2011 | Hirose et al. | |
| 2006/0099507 A1 | 5/2006 | Kogetsu et al. | |
| 2008/0305395 A1 | 12/2008 | Hirose et al. | |
| 2010/0119948 A1 | 5/2010 | Hasegawa et al. | |
| 2012/0107693 A1* | 5/2012 | Ishida et al. | 429/231.8 |
| 2013/0230769 A1* | 9/2013 | Xu | 429/199 |

FOREIGN PATENT DOCUMENTS

| | | |
|---|---|---|
| JP | 2011-051844 | 3/2011 |
| KR | 10-2006-0052584 | 5/2006 |
| KR | 10-2007-0095219 | 9/2007 |
| KR | 10-2008-0107287 | 12/2008 |

OTHER PUBLICATIONS

Extended European Search Report dated Jan. 2, 2013 for EP application No. 12177113.3 (7 pages).

Y. Yao, et al., "Interconnected silicon Hollow Nanospheres for Lithium-Ion Battery Anodes with Long Cycle Life," Nano Letters, 2011, vol. 11, No. 7, pp. 2949-2954.

* cited by examiner

NEGATIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application claims priority to and the benefit of U.S. Provisional Application No. 61/598,188, filed on Feb. 13, 2012 in the USPTO, the entire content of which is incorporated herein by reference.

BACKGROUND (a) Technical Field

Negative active materials for rechargeable lithium batteries, methods of preparing the same, and rechargeable lithium batteries are disclosed.

(b) Description of the Related Art

Lithium rechargeable batteries have recently drawn attention as power sources for small portable electronic devices. Lithium rechargeable batteries use organic electrolyte solutions, and thereby have twice the discharge voltage of conventional batteries using alkaline aqueous solutions. As a result, lithium rechargeable batteries have high energy density.

As the positive active material of a rechargeable lithium battery, lithium-transition element composite oxides capable of intercalating lithium, such as $LiCoO_2$, $LiMn_2O_4$, $LiNi_{1-x}Co_xO_2$ (0<x<1), and so on, have been researched.

As the negative active material of a rechargeable lithium battery, various carbon-based materials have been used, such as artificial graphite, natural graphite, and hard carbon, which may intercalate and deintercalate lithium ions. However, recently, research has been conducted into non-carbon-based negative active materials, such as Si, depending on the desired stability and high-capacity of the battery.

SUMMARY

In one embodiment of the present invention, a negative active material for a rechargeable lithium battery imparts improved high-capacity and cycle-life characteristics to a rechargeable lithium battery.

In another embodiment of the present invention, a method of preparing the negative active material is provided.

In yet another embodiment of the present invention, a rechargeable lithium battery includes the negative active material.

According to an embodiment of the present invention, a negative active material for a rechargeable lithium battery includes a plurality of silicon oxide particles, each silicon oxide particle having a Si phase and an O phase, wherein: each silicon oxide particle comprises an atomic percentage of the Si phase that decreases in a concentration gradient from a larger atomic percentage of the Si phase at a surface of the silicon oxide particle to a smaller atomic percentage of the Si phase towards a center of the particle; each silicon oxide particle comprises an atomic percentage of the O phase that increases in a concentration gradient from a smaller atomic percentage of the O phase at a surface of the silicon oxide particle to a larger atomic percentage of the O phase towards the center of the silicon oxide particle; and a distance between the surface of the silicon oxide particle and a depth at which the atomic percentage of the Si phase is 55 atomic % is about 2% to about 20% of a particle diameter of the silicon oxide particle.

The atomic percentage of the Si phase may be higher than the atomic percentage of the O phase at the surface of each silicon oxide particle.

In a graph of the atomic percentage of the Si phase according to depth from the surface of the silicon oxide particle, an integral value of the atomic percentage of the Si phase from the surface of the silicon oxide particle to a depth at which the atomic percentage of the Si phase is 55 atomic % may be about 5,000 to about 40,000 nm·atomic %.

A distance between the surface of the silicon oxide particle and a depth at which the atomic percentage of the Si phase is 55 atomic % may be about 6% to about 12% of a particle diameter of the silicon oxide particle.

A distance between the surface of the silicon oxide particle and a depth at which the atomic percentage of the Si phase is 55 atomic % may be about 100 nm to about 1000 nm.

The silicon oxide particles may include crystalline Si and non-crystalline silicon oxide and the concentration of crystalline Si may be increased towards the surface of the particle.

The silicon oxide particles may be porous.

The silicon oxide particles may have a specific surface area of about 10 $m^2/g$ to about 500 $m^2/g$.

The silicon oxide particles may include an amount of the Si phase and an amount of the O phase satisfying $SiO_x$ in which x is about 0.5 to about 1.5.

The negative active material may further include a material selected from the group consisting of alkali metals, alkaline-earth metals, Group 13 through Group 16 elements, transition elements, rare earth elements, and combinations thereof.

The silicon oxide particles may have an average particle diameter of about 0.1 µm to about 100 µm.

According to another embodiment of the present invention, a rechargeable lithium battery includes a negative electrode including the negative active material; a positive electrode including a positive active material; and a non-aqueous electrolyte.

According to another embodiment of the present invention, a method for preparing a negative active material for a rechargeable lithium battery includes: heat treating a silicon oxide material in an inert atmosphere to prepare silicon oxide particles comprising a crystalline Si phase and a silicon oxide phase; dispersing the silicon oxide particles in a first solvent to prepare a mixed solution; and adding an etchant to the mixed solution.

The silicon oxide material may include a SiO powder.

The heat treating may be performed at a temperature of about 800 to about 1300° C.

The first solvent may include an aqueous solution.

A molar ratio of the silicon oxide particles to the etchant in the mixed solution may be about 10:1 to about 1:10.

The etchant may be added to the mixed solution at a flow rate of about 0.05 ml/min to about 5 ml/min.

The etchant may include an acid or a material comprising at least one F atom.

The etchant may include an etchant solution comprising an etchant material and a second solvent, wherein a volume ratio of a sum of a volume of the first solvent and a volume of the second solvent to a volume of the etchant material may be about 1:1 to about 30:1.

The etchant solution may be a first solution comprising an etchant material having at least one F atom and having a concentration of the etchant material in the etchant solution of about 0.5M to about 12M, or a second solution having an etching speed substantially the same as an etching speed of the first solution.

The negative active material makes a rechargeable lithium battery having high-capacity and improved cycle-life characteristics.

BRIEF DESCRIPTION OF THE DRAWINGS

FIGS. 2A to 2C are transmission electron microscope (TEM) photographs of the silicon oxide particles prepared according to Example 1, in which FIG. 2A is a bright field image, FIG. 2B is a dark field image, and FIG. 2C is a high resolution image.

FIGS. 3A to 3C are TEM photographs of the silicon oxide particles prepared according to Comparative Example 2, in which FIG. 3A is a bright field image, FIG. 3B is a dark field image, and FIG. 3C is a high resolution image.

DETAILED DESCRIPTION

Figure 1:
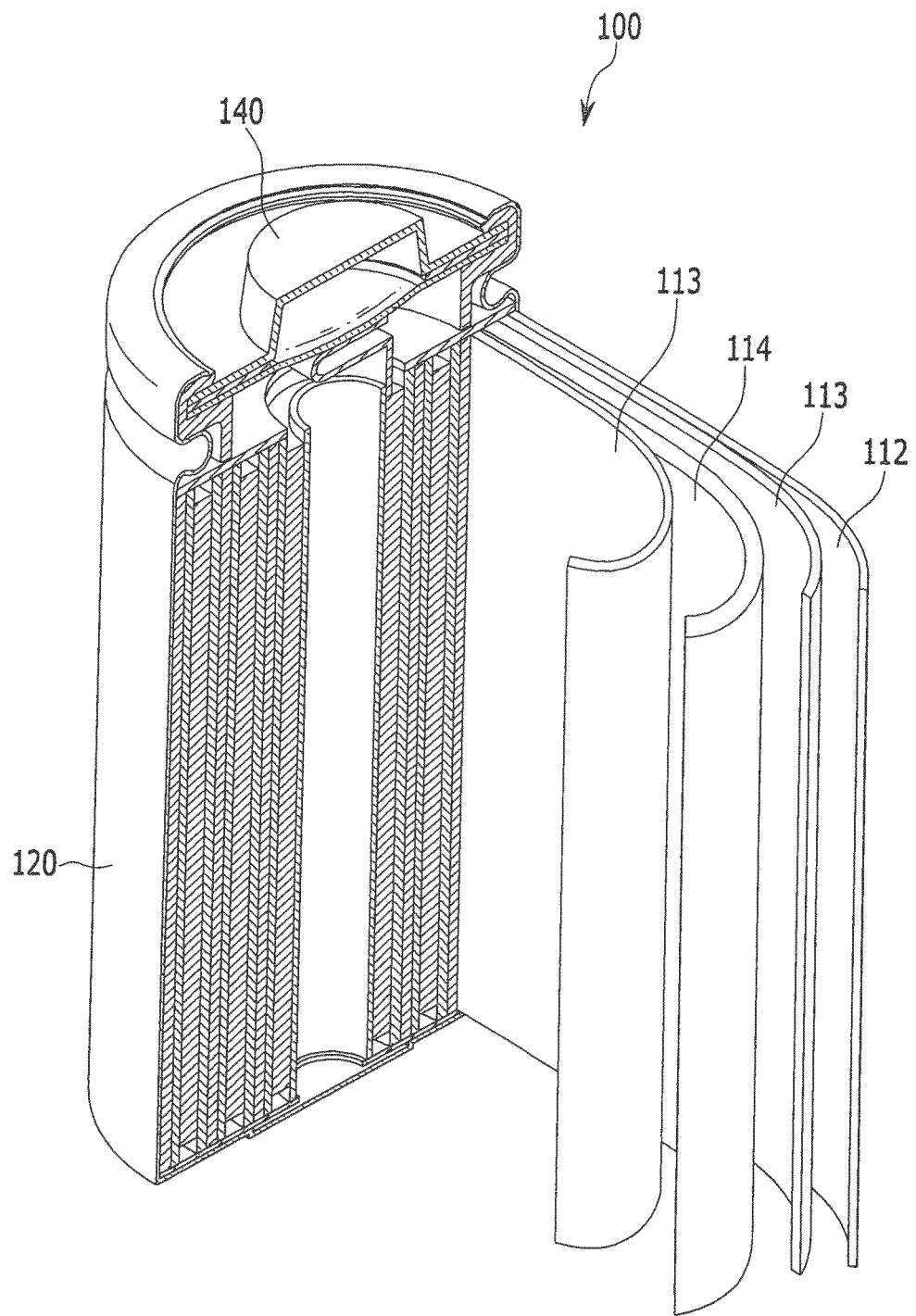
FIG. 1 is a schematic view of a rechargeable lithium battery according to one embodiment of the present invention.

According to one embodiment of the present invention, a negative active material for a rechargeable lithium battery includes silicon oxide particles represented by $SiO_x$ ($0<x<2$) in which an atom % of a silicon phase decreases in a concentration gradient according to a depth from the surface of each particle to the center of the particle, and has an atom % of an O phase that increases in a concentration gradient. Specifically, each silicon oxide particle includes an atomic percentage of the Si phase that decreases in a concentration gradient from a larger atomic percentage of the Si phase at a surface of the silicon oxide particle to a smaller atomic percentage of the Si phase towards a center of the particle, and includes an atomic percentage of the O phase that increases in a concentration gradient from a smaller atomic percentage of the O phase at a surface of the silicon oxide particle to a larger atomic percentage of the O phase towards the center of the silicon oxide particle.

The silicon oxide particles represented by $SiO_x$ ($0<x<2$) may include crystalline Si and non-crystalline silicon oxide.

The silicon oxide particles include concentration gradients of the silicon (Si) phase and the oxygen (O) phase from the surface to the internal center of each particle. The concentration of the silicon (Si) phase increases as it goes toward the surface, while the concentration of the oxygen (O) phase decreases as it goes toward the surface. To be more specific, the concentration of crystalline Si increases as it goes toward the surface.

In a graph of the atomic percentage (atom %) of the silicon (Si) phase according to depth from the surface of the silicon oxide particle, the integral value of the atom % of the silicon (Si) phase from the surface (where the depth is 0) of the silicon oxide particle to a depth at which the atomic percentage of the Si phase is 55 atom % may be about 5000 to about 40000 nm·atom %.

The concentration of a particular element according to the depth from the surface of each particle toward the center of each particle may be measured through X-ray photoelectron spectroscopy (XPS).

The silicon oxide particles have a concentration gradient in which the concentration of a silicon (Si) phase (for example, crystalline Si) is high at the surface and decreases as it goes toward the center of each particle. Herein, when the concentration gradient of the silicon (Si) phase is gradual such that the concentration of the silicon (Si) phase slowly decreases as it goes from the surface toward the center, the above-defined integral increases. Conversely, when the concentration gradient of the silicon (Si) phase is steep such that the concentration of the silicon (Si) phase rapidly decreases as it goes from the surface toward the center, the above-defined integral value decreases.

The silicon oxide particles have a relatively large integral value. This signifies that the concentration gradient of the silicon (Si) phase is gentle in the direction from the surface of each particle toward the center of each particle, and also signifies that the silicon (Si) phase is abundant deep into the inside of each particle.

According to one embodiment, the integral value of the atom % of the silicon (Si) phase from the surface (where the depth is 0) of the silicon oxide particle to a depth at which the atomic percentage of the Si phase is 55 atom % may be about 5,000 to about 40,000 nm·atom %. According to another embodiment, the integral value of the atom % of the silicon (Si) phase from the surface (where the depth is 0) of the silicon oxide particle to a depth at which the atomic percentage of the Si phase is 55 atom % may be about 5,000 to about 38,000 nm·atom %

The distance from the surface to the depth at which the concentration of the silicon (Si) phase is 55 atom % ranges from about 2% to about 20% of the particle diameter. According to one embodiment, the distance may range from about 6% to about 12% of the particle diameter. For example, the distance may range from about 5% to about 10% of the particle diameter.

According to one embodiment, the distance from the surface of the silicon oxide particles to the depth at which the silicon (Si) phase has a concentration of 55 atom % may range from about 100 nm to about 1,000 nm. According to another embodiment, the distance from the surface of the silicon oxide particles to the depth at which the silicon (Si) phase has a concentration of 55 atom % ranges from about 300 to about 600 nm.

The silicon oxide included in the silicon oxide particles (such as $SiO_2$) may function as a resistor, making reactions with lithium difficult, and thereby deteriorating the performance of the negative electrode. However, according to embodiments of the present invention, the silicon oxide particles have a decreased concentration of silicon oxide on the surface of the particles, thereby improving reactivity with lithium and decreasing resistance. Accordingly, the electrochemical characteristics of the resulting rechargeable lithium batteries may be improved.

The negative active material including the silicon oxide particles may yield lithium rechargeable batteries with improved cycle-life characteristics and high capacity.

The negative active material may be prepared by etching silicon oxide particles to remove portions of silicon oxide (such as $SiO_2$) at the surface and interior of the particle. The etching creates a concentration gradient of a Si phase in which the concentration of the Si is greatest at the surface of the particle and gradually decreases toward the center of the particle, and creates a concentration gradient of an O phase in which the concentration of O is greatest at the center of the particle and decreases toward the surface of the particle. The method of preparing the silicon oxide particles will be described later. Pores may be formed in the inside of the particles in the spaces where the silicon oxide (such as $SiO_2$) is removed by etching.

According to one embodiment, the silicon oxide particles may have a specific surface area of about 10 to about 500 $m^2/g$. According to another embodiment, the silicon oxide particles may have a specific surface area of about 10 to about 40 $m^2/g$.

The x value in the $SiO_x$ formula may be about 0.5 to about 1.5. For example, the x value may be about 0.7 to about 0.9 based on the total particles. That is, the x value in the $SiO_x$ formula may be about 0.7 to about 0.9 in terms of the whole particle. When the silicon oxide particles include the silicon (Si) phase in an amount consistent with these ranges, capacity and efficiency may be appropriately improved.

The negative active material may further include an additional element other than Si, selected from alkali metals, alkaline-earth metals, group 13 to 16 elements, transition elements, rare earth elements, and combinations thereof. Nonlimiting examples of the additional element may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The silicon oxide particles may have an average particle diameter of about 0.1 μm to about 100 μm.

Hereafter, an exemplary method of preparing the silicon oxide particles will be described.

According to another embodiment of the present invention, a method for preparing a negative active material for a rechargeable lithium battery includes: forming particles including crystalline Si and a silicon oxide by heat treating the silicon oxide in an inert atmosphere; preparing a mixed solution in which the particles including the crystalline Si and the silicon oxide are dispersed in a solvent; and adding an etchant into the mixed solution at a flow rate of about 0.1 to about 5 ml/min.

Using the method for preparing the negative active material for a rechargeable lithium battery, a negative active material including the silicon oxide particles having the above-described concentration gradient may be prepared.

According to one embodiment, silicon oxide precursor particles including crystalline Si and amorphous $SiO_2$ may be prepared by heat treating a SiO powder in an Ar atmosphere. The heat treatment temperature may be about 800 to about 1300° C. The heat treatment may be performed for about 30 minutes to about 10 hours.

Subsequently, a mixed solution is prepared by dispersing the silicon oxide precursor particles including the crystalline Si and the amorphous $SiO_2$ (which are formed from the heat treatment) in a first solvent. The solvent may be a mixed solvent including water, and the mixed solution may be an aqueous solution. In some embodiments, the first solvent may be an aqueous solution of ethanol, methanol, isopropanol, or the like.

The silicon oxide precursor particles including the crystalline Si and the amorphous $SiO_2$ may be etched by adding an etchant to the mixed solution. According to one embodiment, a mole ratio of the silicon oxide precursor particles to the etchant is about 10:1 to about 1:10 in the mixed solution. For example, the mole ratio of the silicon oxide precursor particles to the etchant may be about 2:1 to about 1:2 in the mixed solution. The extent of the concentration gradient may be controlled by controlling the amount of the etchant and the amount of the silicon oxide precursor particles to be within the above weight ratio ranges.

The etchant may be added to the mixed solution at a flow rate of about 0.05 to about 5 ml/min. According to one embodiment, the etchant is added to the mixed solution at a flow rate of about 0.5 to about 2 ml/min. The extent of the concentration gradient may be controlled by controlling the flow rate of the etchant to be within these ranges.

The etching may occur deep inside each particle by controlling the extent of the concentration gradient, thereby creating a phase with an abundance of silicon (Si).

As the etchant, any material conventionally used as an etching solution may be used without restriction. For example, acids (such as nitric acids and sulfuric acids) may be used, or F ion-containing compounds (such as HF, $NH_4F$, and $NH_4HF_2$) may be used. According to one embodiment, the etching process may be performed faster by using a F ion-containing compound, or a mixture of an acid and an F-ion containing compound, as the etchant. Indeed, mixing an acid with a F-ion containing compound can achieve fast etching speeds while reducing the amount of the F-ion containing compound needed to achieve such a speed.

The etchant may be used as a form of an etchant solution including an etchant and a second solvent. For example, the etchant solution may be an aqueous solution. In the etchant solution, the concentration of the etchant may be adjusted according to the desired etching speed. For example, when the etchant material is an F-ion containing compound, the etchant solution may have a concentration of the etchant of about 0.5M to 12M. When the etchant material is something other than an F-ion containing compound, the concentration of the etchant material in the etchant solution may be adjusted in order to achieve an etching speed that is substantially the same as the etching speed achieved by an etchant solution including the above concentration (i.e., 0.5M to 12M) of an F-ion containing compound. For example, when an acid solution is used, a solution of a higher concentration may be needed to achieve the same etching speed and effects as an F-ion containing compound.

The etchant is added in a predetermined amount in order to obtain the desired ratio of the etchant to the solvent in the mixed solution, and then the mixture is allowed to stand for about 5 minutes to about 30 minutes to allow the etching reaction to proceed.

According to yet another embodiment of the present invention, a rechargeable lithium battery includes a negative electrode including the negative active material; a positive electrode including a positive active material; and a non-aqueous electrolyte.

Rechargeable lithium batteries may be classified into lithium ion batteries, lithium ion polymer batteries, and lithium polymer batteries according to the presence of a separator and the kind of electrolyte used in the battery. Rechargeable lithium batteries may have a variety of shapes and sizes, for example, they may be cylindrical, prismatic, or coin-type batteries, and may be thin film batteries or may be rather bulky in size. Structures and fabrication methods for lithium ion batteries are well known in the art.

FIG. 1 is an exploded perspective view of a rechargeable lithium battery in accordance with an embodiment. Referring to FIG. 1, the rechargeable lithium battery 100 is cylindrical in shape and includes a negative electrode 112, a positive electrode 114, a separator 113 between the positive electrode 114 and negative electrode 112, an electrolyte (not shown) impregnating the negative electrode 112, the positive electrode 114, and the separator 113, a battery case 120, and a sealing member 140 sealing the battery case 120. The rechargeable lithium battery 100 is fabricated by sequentially stacking a negative electrode 112, a positive electrode 114, and separator 113, spiral-winding the stack, housing the wound stack in the battery case 120, and sealing the battery with the sealing member 140. The electrolyte is injected in the battery case to impregnate the stack.

The negative electrode includes a current collector and a negative active material layer on the current collector, and the negative active material layer includes a negative active material. The negative active material is the same as described above. The negative active material layer may further include a binder, and optionally may further include a conductive material.

The binder improves the binding properties of the negative active material particles to each other and to the current collector. Nonlimiting examples of the binder include polyvinylalcohol, carboxymethylcellulose, hydroxypropylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof.

Any electrically conductive material may be used as a conductive material so long as it does not cause a chemical change. Nonlimiting examples of the conductive material include: carbon-based materials such as natural graphite, artificial graphite, carbon black, acetylene black, ketjen black, carbon fibers, and the like; metal-based materials, such as metal powders or metal fibers including copper, nickel, aluminum, silver, and the like; conductive polymers, such as polyphenylene derivatives; and mixtures thereof.

The current collector may be a copper foil, a nickel foil, a stainless steel foil, a titanium foil, a nickel foam, a copper foam, a polymer substrate coated with a conductive metal, or a combination thereof.

The positive electrode includes a current collector and a positive active material layer on the current collector.

The positive active material may include a lithiated intercalation compound that reversibly intercalates and deintercalates lithium ions. The positive active material may include a composite oxide including at least one of cobalt, manganese, and nickel, as well as lithium. In particular, the following lithium-containing compounds may be used:

$Li_aA_{1-b}R_bD_2$ (0.90≤a≤1.8 and 0≤b≤0.5);
$Li_aE_{1-b}R_bO_{2-c}D_c$ (0.90≤a≤1.8, 0≤b≤0.5 and 0≤c≤0.05);
$LiE_{2-b}R_bO_{4-c}D_c$ (0≤b≤0.5, 0≤c≤0.05);
$Li_aNi_{1-b-c}Co_bR_cD_\alpha$ (0.90≤a≤1.8, 0≤b≤0.5, 0≤c≤0.05 and 0<α≤2);
$Li_aNi_{1-b-c}Co_bR_cO_{2-\alpha}Z_\alpha$ (0.90≤a≤1.8, 0≤b≤0.5, 0≤c≤0.05 and 0<α<2);
$Li_aNi_{1-b-c}Co_bR_cO_{2-\alpha}Z_2$ (0.90≤a≤1.8, 0≤b≤0.5, 0≤c≤0.05 and 0<α<2);
$Li_aNi_{1-b-c}Mn_bR_cD_\alpha$ (0.90≤a≤1.8, 0≤b≤0.5, 0≤c≤0.05 and 0<α≤2);
$Li_aNi_{1-b-c}Mn_bR_cO_{2-\alpha}Z_\alpha$ (0.90≤a≤1.8, 0≤b≤0.5, 0≤c≤0.05 and 0<α<2);
$Li_aNi_{1-b-c}Mn_bR_cO_{2-\alpha}Z_2$ (0.90≤a≤1.8, 0≤b≤0.5, 0≤c≤0.05 and 0<α<2);
$Li_aNi_bE_cG_dO_2$ (0.90≤a≤1.8, 0≤b≤0.9, 0≤c≤0.5 and 0.001≤d≤0.1);
$Li_aNi_bCo_cMn_dGeO_2$ (0.90≤a≤1.8, 0≤b≤0.9, 0≤c≤0.5, 0≤d≤0.5, 0.001≤e≤0.1);
$Li_aNiG_bO_2$ (0.90≤a≤1.8 and 0.001≤b≤0.1);
$Li_aCoG_bO_2$ (0.90≤a≤1.8 and 0.001≤b≤0.1);
$Li_aMnG_bO_2$ (0.90≤a≤1.8 and 0.001≤b≤0.1);
$Li_aMn_2G_bO_4$ (0.90≤a≤1.8 and 0.001≤b≤0.1);
$QO_2$;
$QS_2$;
$LiQS_2$;
$V_2O_5$;
$LiV_2O_5$;
$LiTO_2$;
$LiNiVO_4$;
$Li_{(3-f)}J_2(PO_4)_3$ (0≤f≤2);
$Li_{(3-f)}Fe_2(PO_4)_3$ (0≤f≤2); and
$LiFePO_4$.

In the above chemical formulae, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; and J may be V, Cr, Mn, Co, Ni, Cu, or a combination thereof.

The compound can have a coating layer on the surface, or can be mixed with a compound having a coating layer. The coating layer may include at least one coating element compound selected from oxides of a coating element, hydroxides of a coating element, oxyhydroxides of a coating element, oxycarbonates of a coating element, and hydroxy-carbonates of a coating element. The compounds for the coating layer can be amorphous or crystalline. The coating element for the coating layer may include Mg, Al, Co, K, Na, Ca, Si, Ti, V, Sn, Ge, Ga, B, As, Zr, or a mixture thereof. The coating layer can be formed any method so long as it does not negatively influence the properties of the positive active material. For example, the method may include any coating method, such as spray coating, dipping, or the like, which are well-known to those of ordinary skill in the art.

The positive active material layer may include a binder and a conductive material.

The binder improves the binding properties of the positive active material particles to each other and to the current collector. Nonlimiting examples of the binder include polyvinyl alcohol, carboxymethyl cellulose, hydroxypropyl cellulose, diacetyl cellulose, polyvinylchloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof.

The conductive material is used to provide conductivity to the electrode. The conductive material may include any electrically conductive material so long as it does not cause a chemical change. For example, the conductive material may include natural graphite, artificial graphite, carbon black, acetylene black, ketjen black, carbon fiber, metal powder, metal fiber or the like such as copper, nickel, aluminum, silver, a polyphenylene derivative, or the like, or a combination thereof.

The current collector may be Al, but is not limited thereto.

Each of the negative and positive electrodes may be fabricated by mixing the active material, a conductive material, and a binder into an active material composition, and coating the composition on a current collector. The electrode manufacturing method is well known. The solvent may include N-methylpyrrolidone or the like, but is not limited thereto.

The electrolyte includes a non-aqueous organic solvent and a lithium salt.

The non-aqueous organic solvent serves as a medium for transmitting the ions taking part in the electrochemical reaction of the battery.

The non-aqueous organic solvent may include a carbonate-based, ester-based, ether-based, ketone-based, alcohol-based, or aprotic solvent. Nonlimiting examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. Nonlimiting examples of the ester-based solvent may include methyl acetate, ethyl acetate, n-propyl acetate, methylpropionate, ethylpropionate, γ-butyrolactone, decanolide, valerolactone, mevalonolactone, caprolactone, and the like. Nonlimiting examples of the ether-based solvent include dibutyl ether, tetraglyme, diglyme, dimethoxyethane, 2-methyltetrahydrofuran, tetrahydrofuran, and the like. Nonlimiting examples of the ketone-based solvent include cyclohexanone, and the like. Nonlimiting examples of the alcohol-based solvent include ethyl alcohol, isopropyl alcohol, and the like. Nonlimiting examples of the aprotic solvent include nitriles such as R—CN (where R is a C2 to C20 linear, branched, or cyclic hydrocarbon group including a double bond, an aromatic ring, or an ether bond), amides such as dimethylformamide, dioxolanes such as 1,3-dioxolane, sulfolanes, and the like.

A single non-aqueous organic solvent may be used, or a mixture of solvents may be used. When a mixture of solvents is used, the mixture ratio can be adjusted in accordance with the desired battery performance.

The carbonate-based solvent may be prepared by mixing a cyclic carbonate and a linear carbonate. The cyclic carbonate and the linear carbonate may be mixed together in a volume ratio of about 1:1 to about 1:9. Within this range, electrolyte performance may be improved.

The non-aqueous organic electrolyte may include a carbonate-based solvent and an aromatic hydrocarbon-based solvent. The carbonate-based and aromatic hydrocarbon-based solvents may be mixed together in a volume ratio ranging from about 1:1 to about 30:1.

The aromatic hydrocarbon-based organic solvent may be represented by the following Chemical Formula 1.

Chemical Formula 1

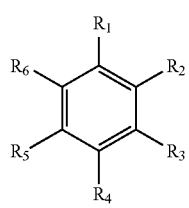

In Chemical Formula 1, each of $R_1$ to $R_6$ is independently hydrogen, a halogen, a C1 to C10 alkyl group, a C1 to C10 haloalkyl group, or a combination thereof.

Nonlimiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include vinylene carbonate, an ethylene carbonate-based compound represented by the following Chemical Formula 2, or a combination thereof to improve cycle-life.

Chemical Formula 2

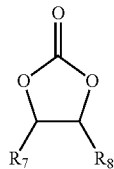

In Chemical Formula 2, each of $R_7$ and $R_8$ are independently selected from hydrogen, hydrogen, a halogen, a cyano group (CN), a nitro group ($NO_2$), and a C1 to C5 fluoroalkyl group, provided that at least one of $R_7$ and $R_8$ is selected from a halogen, a cyano group (CN), a nitro group ($NO_2$), and a C1 to C5 fluoroalkyl group. That is, at least one of $R_7$ and $R_8$ is not hydrogen.

Nonlimiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in the organic solvent and supplies the lithium ions in the battery, thereby enabling the basic operation of the rechargeable lithium battery, and improving lithium ion transportation between the positive and negative electrodes. Nonlimiting examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, $LiB(C_2O_4)_2$ (lithium bis(oxalato)borate, LiBOB), and combinations thereof. The lithium salt may be included in a concentration of about 0.1 M to 2.0 M. When the lithium salt is included at a concentration within this range, the electrolyte may have good performance and lithium ion mobility due to optimal electrolyte conductivity and viscosity.

The separator 113 may include any material commonly used in conventional lithium batteries as long as it achieves separation of the negative electrode 112 from the positive electrode 114 and allows passage of lithium ions. In other words, the separator may have low resistance to ion transport and good electrolyte impregnation properties. For example, the separator may be selected from glass fiber, polyester, TEFLON (tetrafluoroethylene), polyethylene, polypropylene, polytetrafluoroethylene (PTFE), and combinations thereof. The separator may be a non-woven fabric or a woven fabric. For example, for a lithium ion battery, a polyolefin-based polymer separator such as polyethylene, polypropylene or the like is mainly used. In order to ensure heat resistance or mechanical strength, a coated separator including a ceramic component or a polymer material may be used. Selectively, the separator may be a mono-layered or multi-layered structure.

The following examples illustrate the present invention in more detail. These examples, however, are presented for illustrative purposed only and do not limit the scope of the present invention.

EXAMPLE

Example 1

Preparation of Negative Active Material

Heat treatment was performed on a SiO powder at 1000° C. in an Ar atmosphere for 1 hour. 100 g of the powder obtained from the heat treatment was dispersed in 350 mL of a 40 volume % aqueous ethanol solution. 50 mL of a 49 volume % HF solution was added to the dispersion solution at a flow rate of 1 ml/min while agitating the dispersion solution at a speed of 300 RPM. After the addition was completed, the resultant solution was allowed to stand for 30 minutes to allow the etching reaction to proceed. After the reaction was completed, a silicon oxide particle powder was obtained by cleaning the powder with an aspirator and transmitting 5 L of distilled water through the aspirator. The resulting silicon oxide particles had median particle size distribution (D50) of 5 μm.

Example 2

Preparation of Negative Active Material

A silicon oxide particle powder was obtained according to the same method as Example 1, except that 100 mL of a 49 volume % HF aqueous solution was added. The resulting silicon oxide particles had median particle size distribution (D50) of 5 μm.

Example 3

Preparation of Negative Active Material

A silicon oxide particle powder was obtained according to the same method as Example 1, except that 200 mL of a 49 volume % HF aqueous solution was added. The resulting silicon oxide particles had median particle size distribution (D50) of 5 μm.

Example 4

Preparation of Negative Active Material

A silicon oxide particle powder was obtained according to the same method as Example 1, except that the HF aqueous solution was added at a flow rate of 0.5 ml/min. The resulting silicon oxide particles had median particle size distribution (D50) of 5 μm.

Example 5

Preparation of Negative Active Material

A silicon oxide particle powder was obtained according to the same method as Example 1, except that the HF aqueous solution was added at a flow rate of 2.0 ml/min. The resulting silicon oxide particles had median particle size distribution (D50) of 5 μm.

Comparative Example 1

Preparation of Negative Active Material

A silicon oxide particle powder was obtained by heat treating a SiO powder at 1000° C. in an Ar atmosphere for 1 hour. The resulting silicon oxide particles had median particle size distribution (D50) of 5 μm.

Comparative Example 2

Preparation of Negative Active Material

Heat treatment was performed on a SiO powder at 1000° C. in an Ar atmosphere for 1 hour. 100 g of the powder obtained from the heat treatment was added to 50 mL of a 49 volume % HF solution all at once, and the reaction was allowed to proceed for 30 minutes. After the reaction was completed, a silicon oxide particle powder was obtained by cleaning the powder with an aspirator and transmitting 5 L of distilled water through the aspirator. The resulting silicon oxide particles had median particle size distribution (D50) of 5 μm.

Figure 2A:
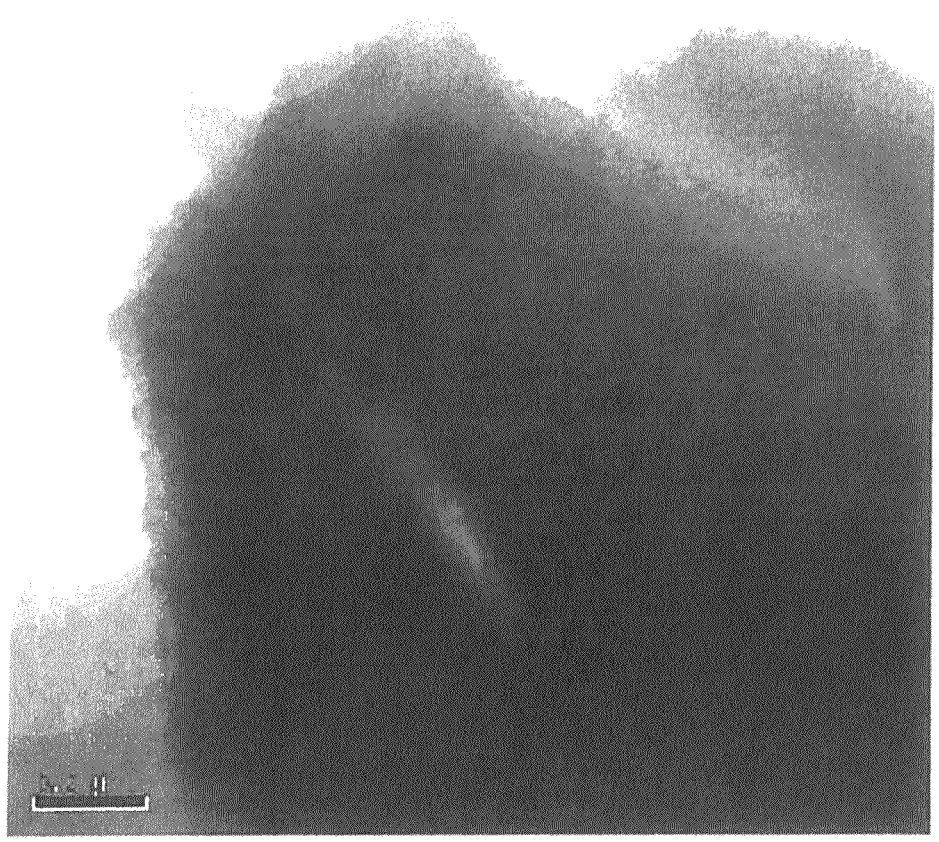
Figure 2B:
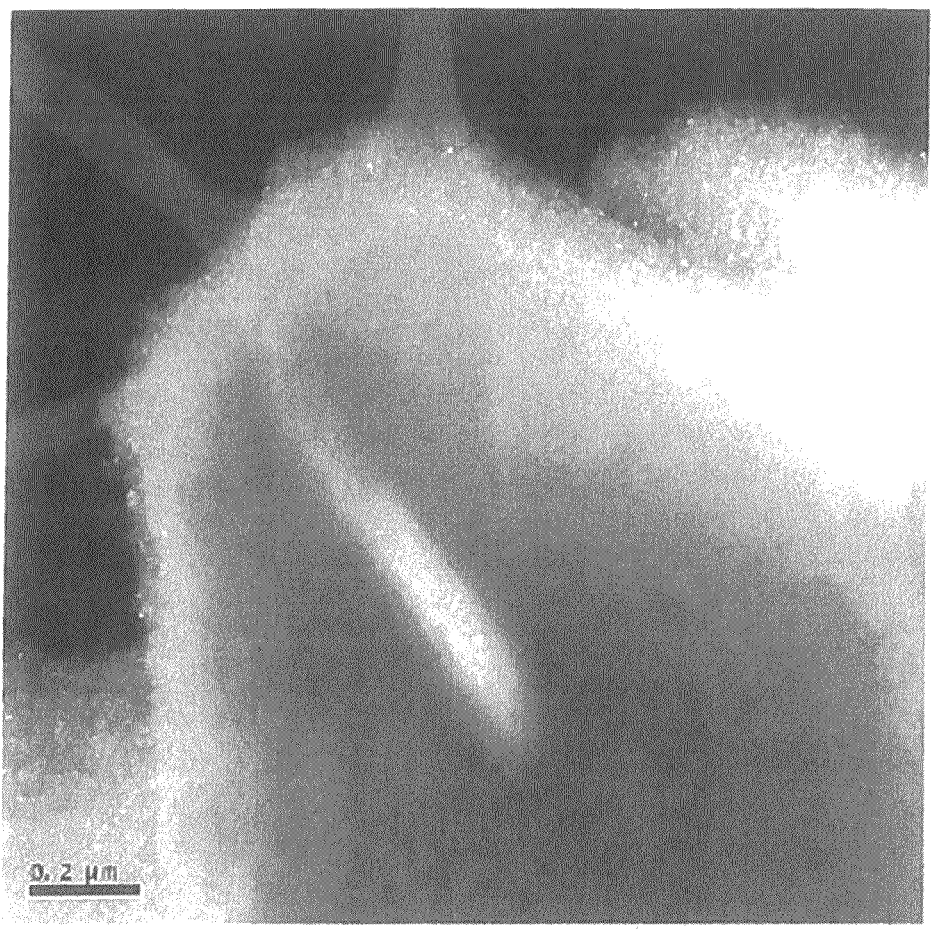
Figure 2C:
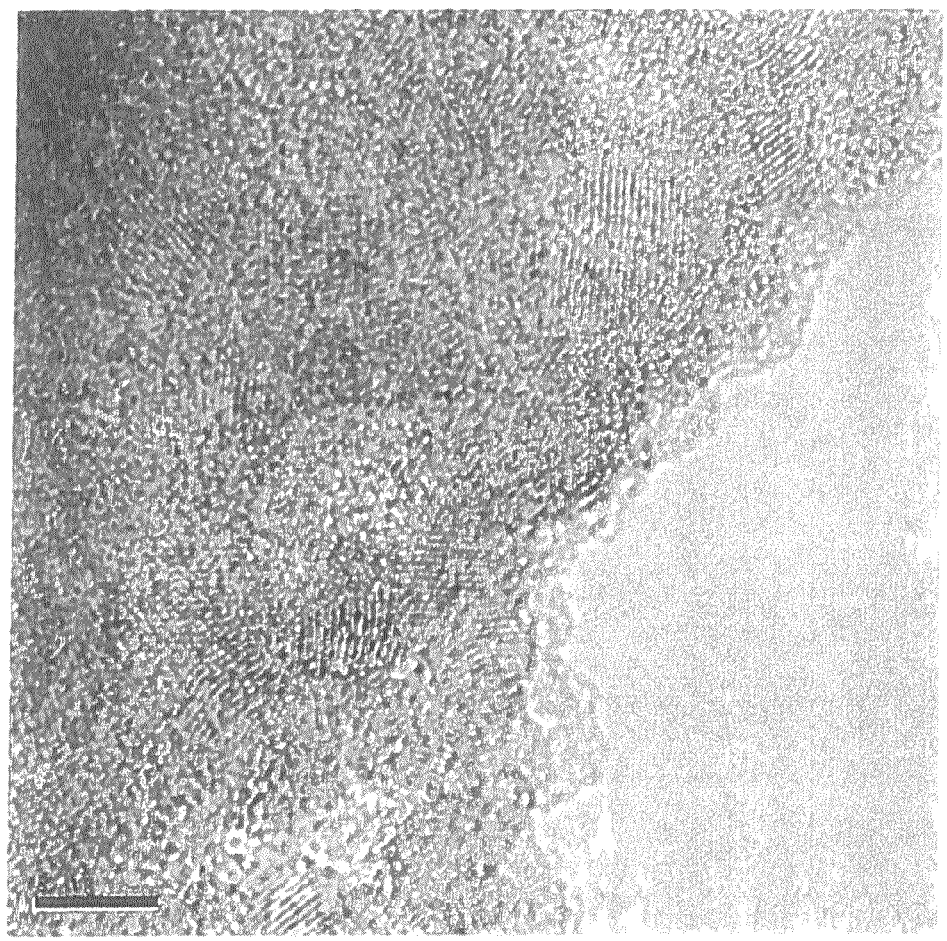
Figure 3A:
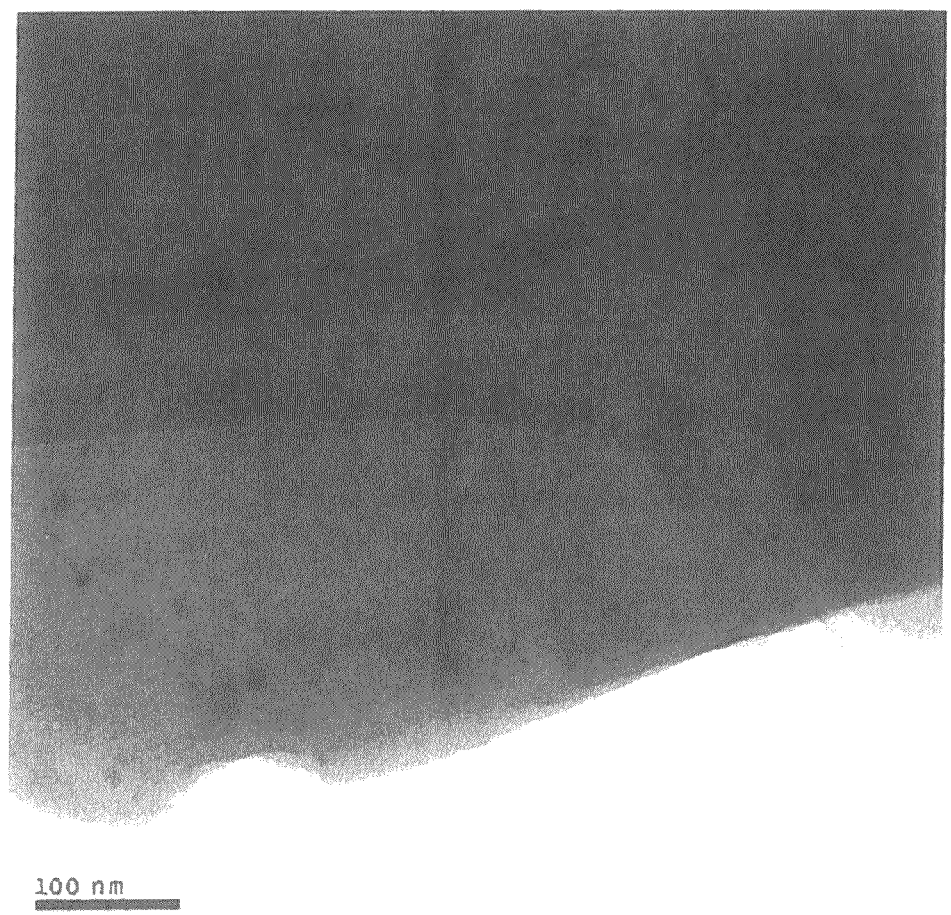
Figure 3B:
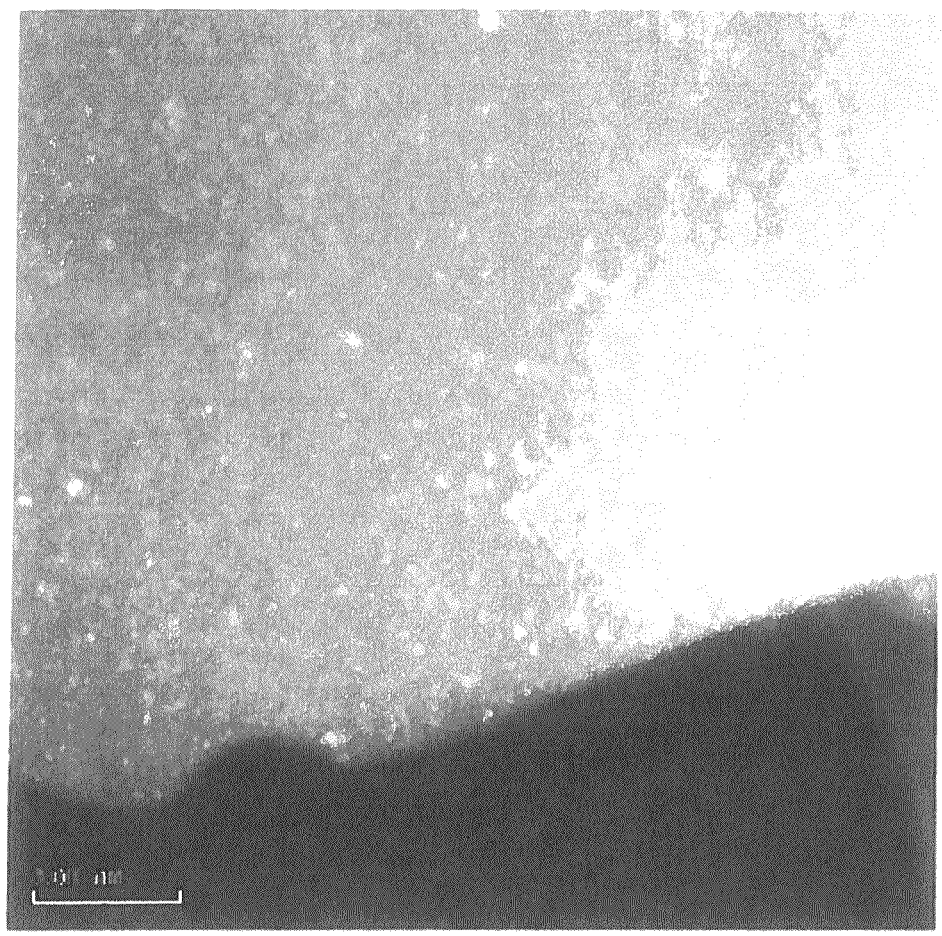
Figure 3C:
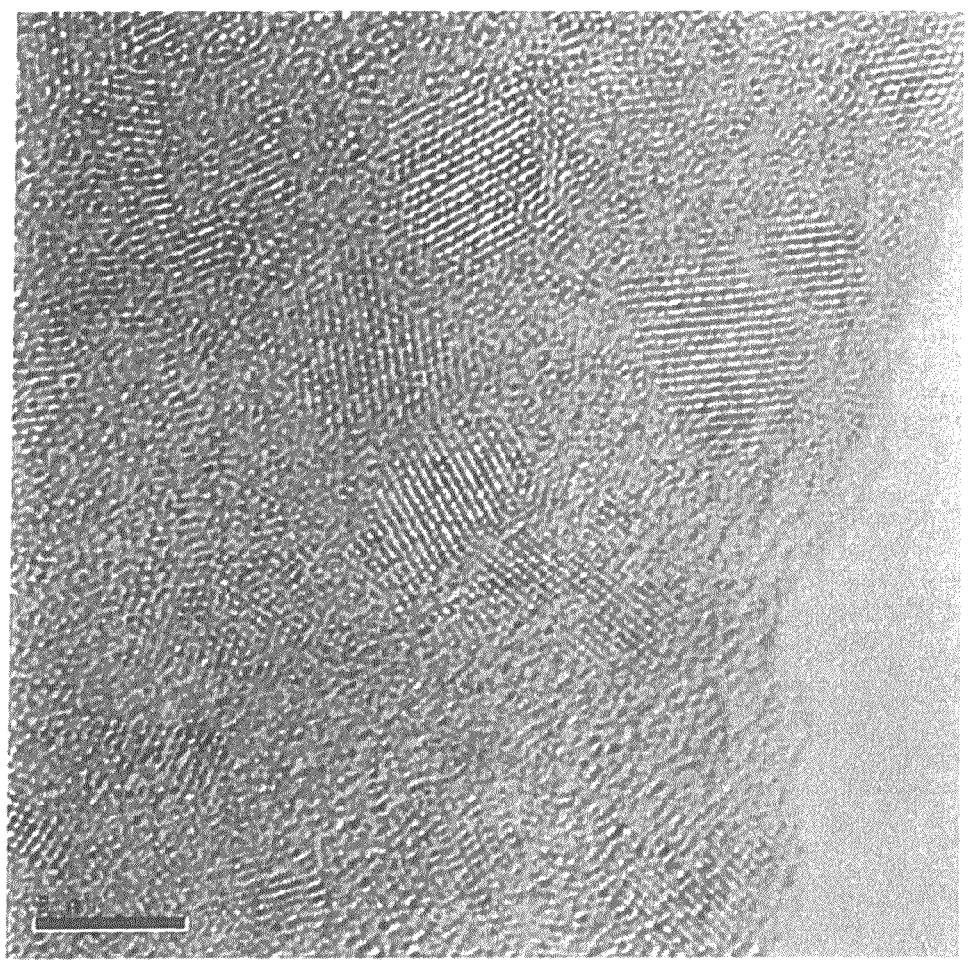

FIGS. 2A to 2C are transmission electron microscope (TEM) photographs of the silicon oxide particles prepared according to Example 1. FIG. 2A is a bright field image and FIG. 2B is a dark field image. FIG. 2C is a high resolution image. FIGS. 3A to 3C are TEM photographs of the silicon oxide particles prepared according to Comparative Example 2. FIG. 3A is a bright field image and FIG. 3B is a dark field image. FIG. 3C is a high resolution image. As shown in FIG. 3B, the silicon (Si) particles of Comparative Example 2 (shown in a bright white color) appeared evenly throughout the particles. However, as shown in FIG. 2B, the silicon (Si) particles of Example 1 (shown in a bright white color) appeared mainly on the surface. In short, it may be seen that the silicon oxide particles prepared according to Example 1 had a high concentration of a silicon (Si) phase on the surface.

Experimental Example 1

Measurement of Internal Concentration Through X-ray Photoelectron Spectroscopy (XPS)

X-ray photoelectron spectroscopy (XPS) was performed on the silicon oxide particles prepared according to Examples 1 to 5 and Comparative Example 1 and 2, and graphs of the atom % concentration of the silicon (Si) phase and the atom % concentration of the oxygen (O) phase according to depth from the surface of each particle toward the center of the particle were obtained from the XPS measurement results.

XPS Analysis Condition
  Analysis apparatus: ESCA 250 spectrometer
  Pressure in analysis chamber: $8*10^{-10}$ mbar
  Used radiation ray: monochromatic $Al_{k\alpha}$
  Activation energy of X-ray: 1486.8 eV
  Analysis area: 500 μm$^2$ Approximate thickness of a surface layer of XPS analysis: about 5 nm Depth condition: Depth profile was obtained through $Ar^+$ ion beam sputtering (3 keV). The sputtering speed for $SiO_2$ was 10 nm/min.

Figure 4:
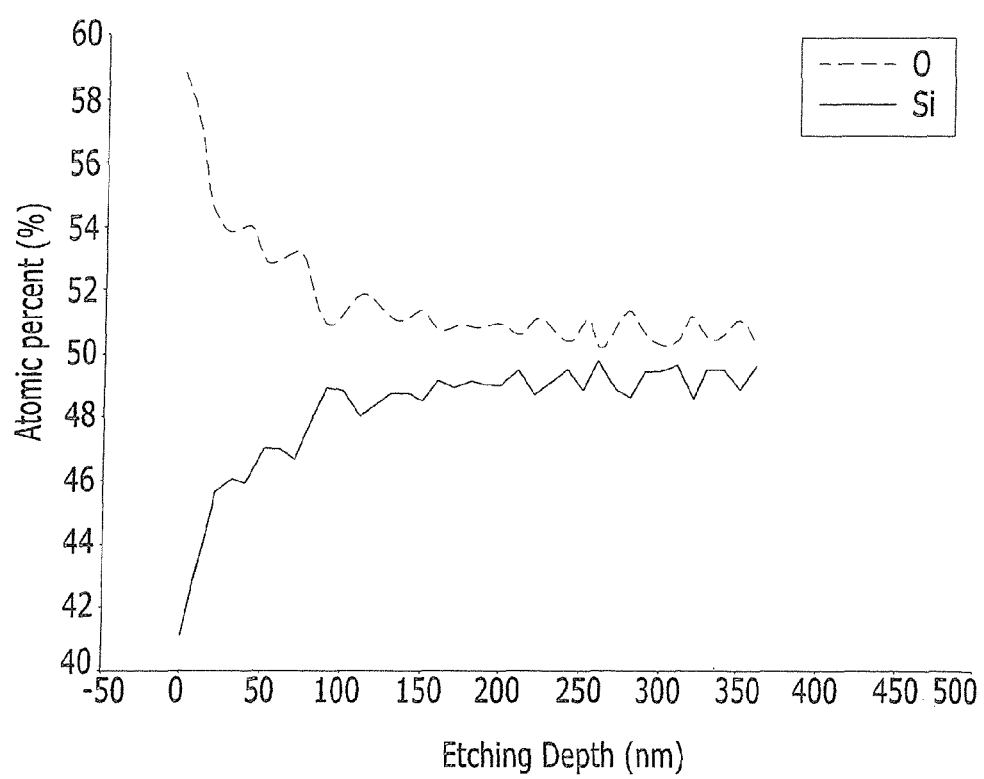
FIG. 4 is an X-ray photoelectron spectroscopy (XPS) analysis graph of the silicon oxide particles prepared according to Comparative Example 1.

FIG. 4 shows the analysis of the silicon oxide particles prepared according to Comparative Example 1. The surface was oxidized, and an oxygen-abundant phase was formed on the surface.

Figure 5:
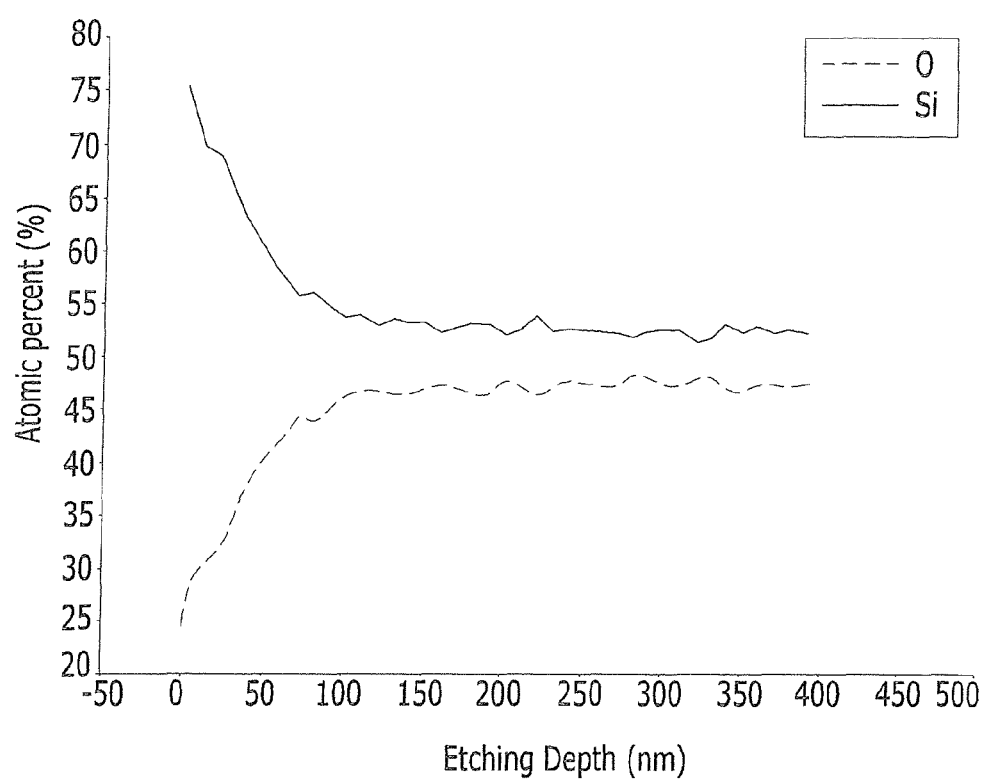
FIG. 5 is an XPS analysis graph of the silicon oxide particles prepared according to Comparative Example 2.
Figure 6:
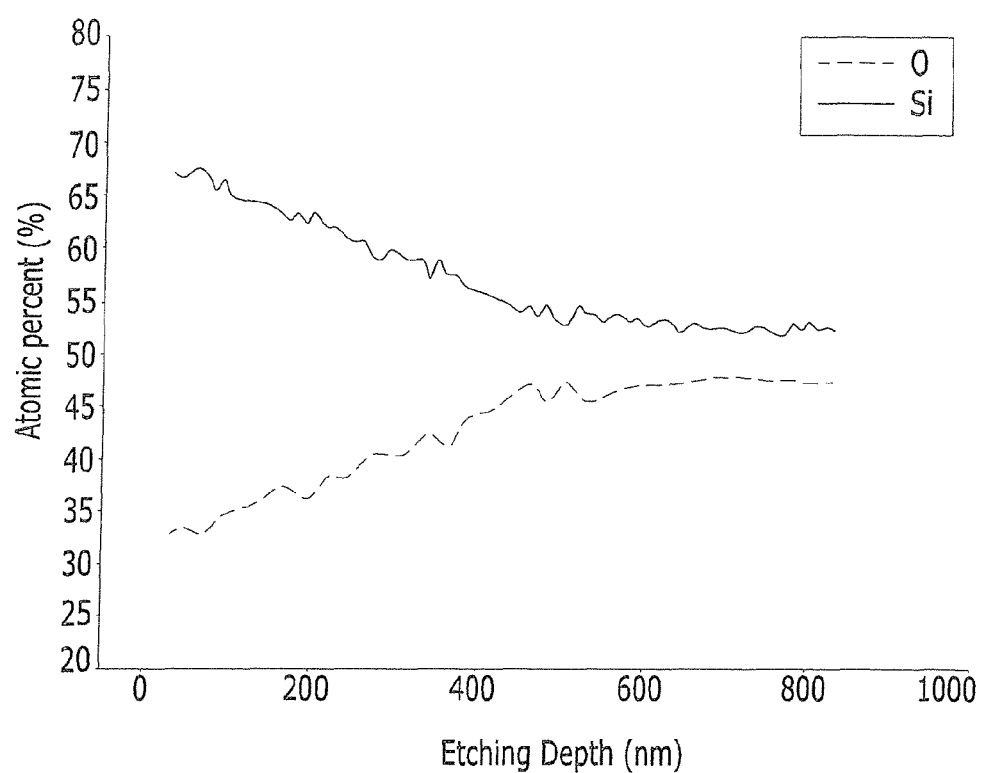
FIG. 6 is an XPS analysis graph of the silicon oxide particles prepared according to Example 2.
Figure 7:
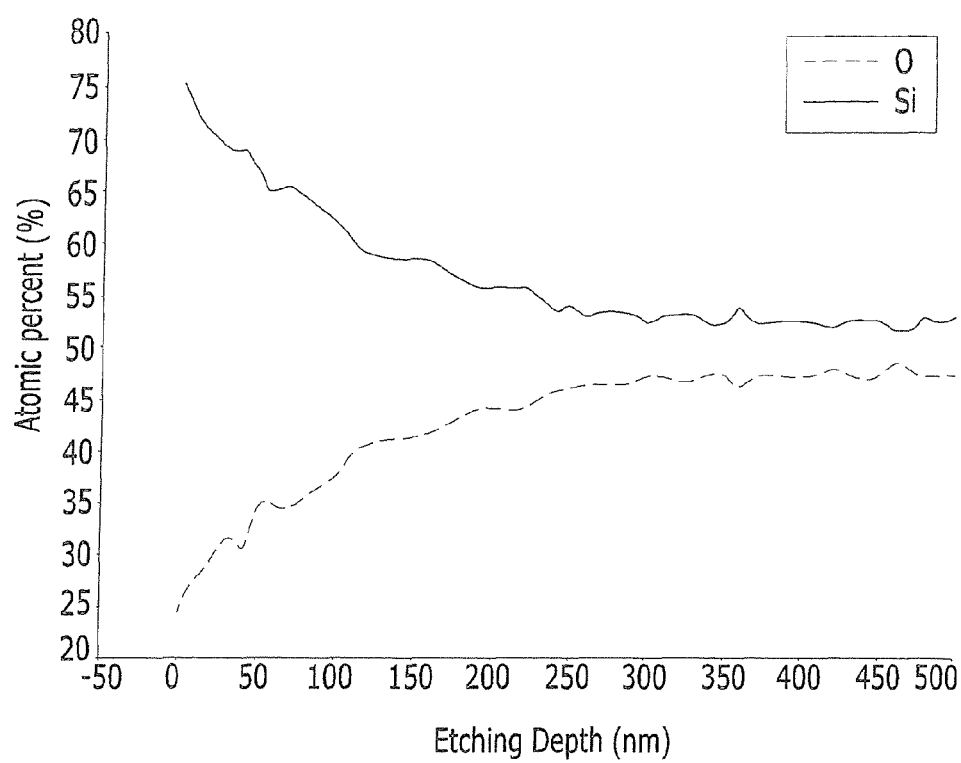
FIG. 7 is an XPS analysis graph of the silicon oxide particles prepared according to Example 5.

FIG. 5 shows the analysis of the silicon oxide particles prepared according to Comparative Example 2, and FIGS. 6 and 7 show the analyses of the silicon oxide particles prepared according to Examples 2 and 5, respectively. As seen in the Figures, the silicon oxide particles of Comparative Example 2 had a profile in which the amount of silicon (Si) rapidly decreased from the surface toward the center of the particle because the silicon oxide was drastically etched from the surface. However, the silicon oxide particles of Examples 2 and 5 had a smooth and gradual concentration gradient from the surface to the center.

In the graph, the integral value of the atomic percentage of the Si phase from the surface of the silicon oxide particle to a depth at which the atomic percentage of the Si phase is 55 atomic % was obtained, and the results are presented in Table 1.

Figure 8:
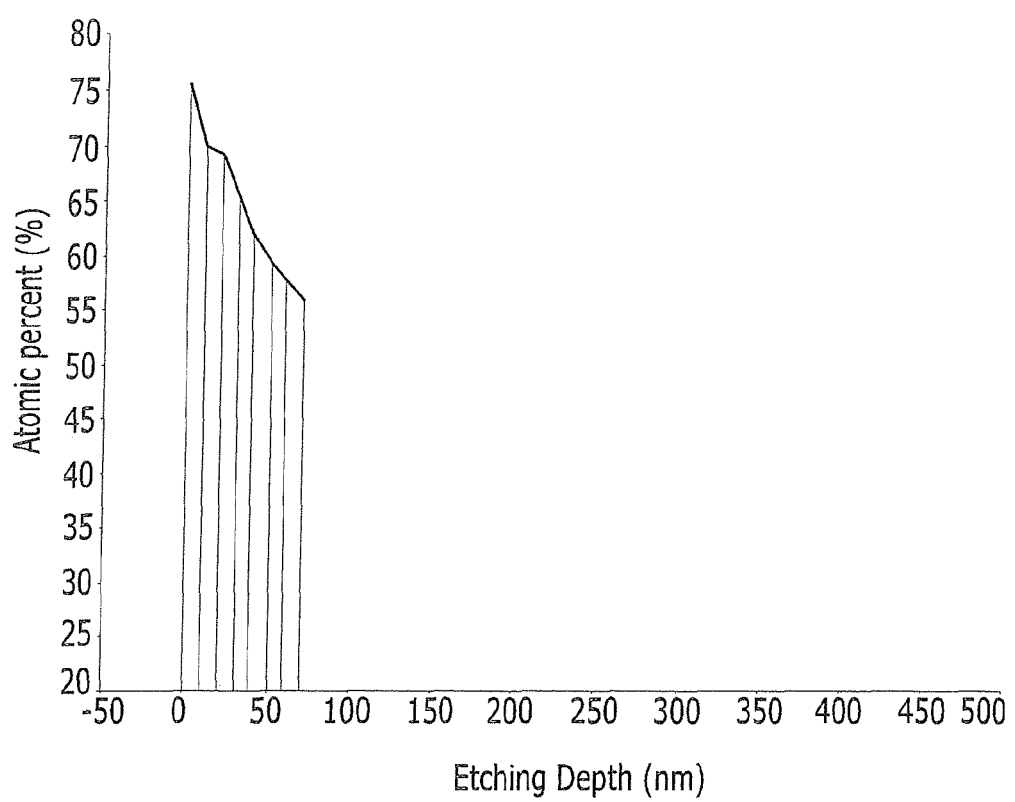
FIG. 8 is an XPS analysis graph showing the area obtained by calculating the integral value of the atom % concentration of the silicon (Si) phase of the silicon oxide particles prepared according to Comparative Example 2 from the surface to the depth at which the concentration of the silicon (Si) phase is 55 atom %.

FIG. 8 shows the area obtained by calculating the integral value of the particles of Comparative Example 2. The depth at which the concentration of the silicon (Si) element was 55 atom % was about 70 nm, and thus the integral value of the concentration of the silicon (Si) phase from the surface to the depth of about 70 nm was calculated and shown in the following Table 1.

Figure 9:
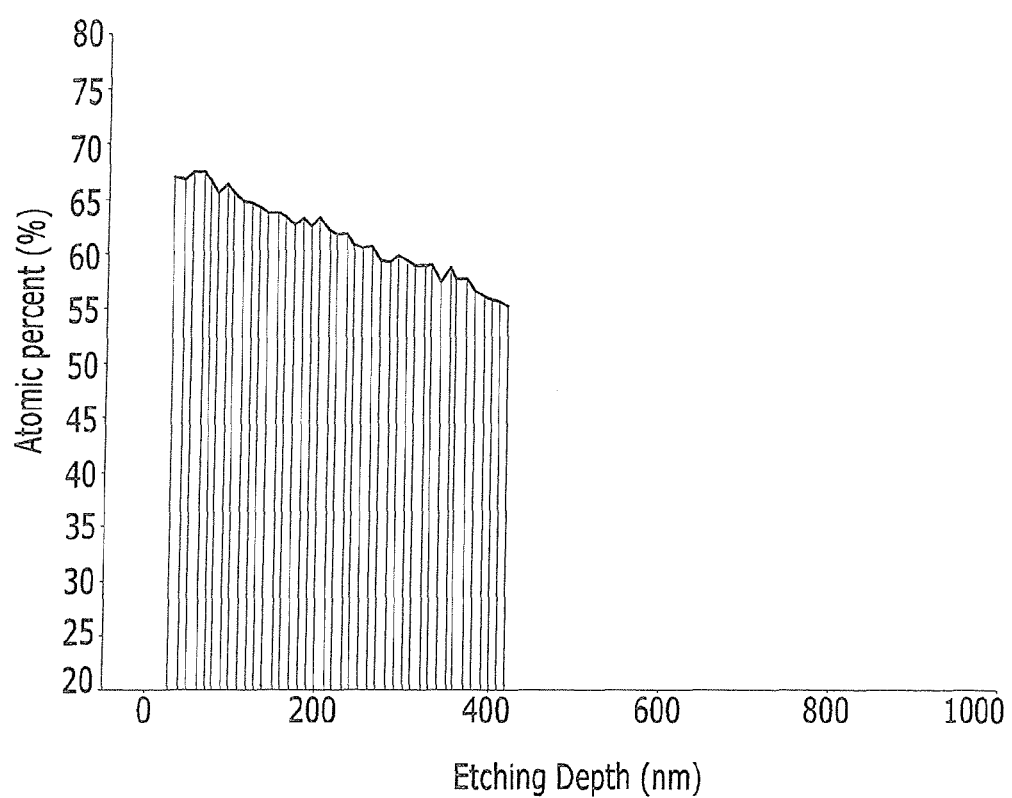
FIG. 9 is an XPS analysis graph showing the area obtained by calculating the integral value of the atom % concentration of the silicon (Si) phase of the silicon oxide particles prepared according to Example 2 from the surface to the depth at which the concentration of the silicon (Si) phase is 55 atom %.

FIG. 9 shows the area obtained by calculating the integral value of the particles of Example 2. The depth at which the concentration of the silicon (Si) element was 55 atom % was about 420 nm, and the integral value of the concentration of the silicon (Si) phase from the surface to the depth of 420 nm was calculated and is shown in the following Table 1.

The integral values of Examples 3 to 5 were calculated according to the same method as FIGS. 8 and 9 and shown in the following Table 1.

TABLE 1

|  | Area (nm · atomic %) | Specific surface area ($m^2/g$) |
|---|---|---|
| Example 1 | 19020 | 14.6 |
| Example 2 | 24014 | 31.2 |
| Example 3 | 38067 | 38.8 |
| Example 4 | 26653 | 15.2 |
| Example 5 | 12020 | 25.9 |
| Comparative Example 1 | — | 1.7 |
| Comparative Example 2 | 4508 | 8.1 |

Experimental Example 2

Evaluation of Capacity Characteristic 2016 coin-type half-cells were manufactured using the silicon oxide particle powders prepared according to Examples 1 to 5 and Comparative Examples 1 to 2 as the negative active material. An electrode plate was manufactured by preparing a composition of active material:conductive material:binder at a weight ratio of 80:10:10, using Denka black as the conductive material, polyimide (PI) as the binder, and N-methyl-2-pyrrolidone (NMP) as the solvent. Fabrication of the battery cell was completed by using lithium metal as the counter electrode, positioning a separator between the electrodes, injecting an electrolyte solution, and sealing the battery. As the electrolyte solution, a mixture of EC (ethylene carbonate)/EMC (ethylmethyl carbonate)/DMC (dimethyl carbonate) at a volume ratio of 3/3/4 was used, and 5 volume % of fluorinated ethyl carbonate (FEC) was used as an additive.

The fabricated rechargeable lithium battery cells were charged/discharged in a first cycle at 25° C. with a rate of 0.05 C at a voltage of 0.05V to 1.4V, and the first cycle charge quantities of the rechargeable lithium battery cells are shown in the following Table 2.

Experimental Example 3

Estimation of Cycle-Life Characteristics

Figure 10:
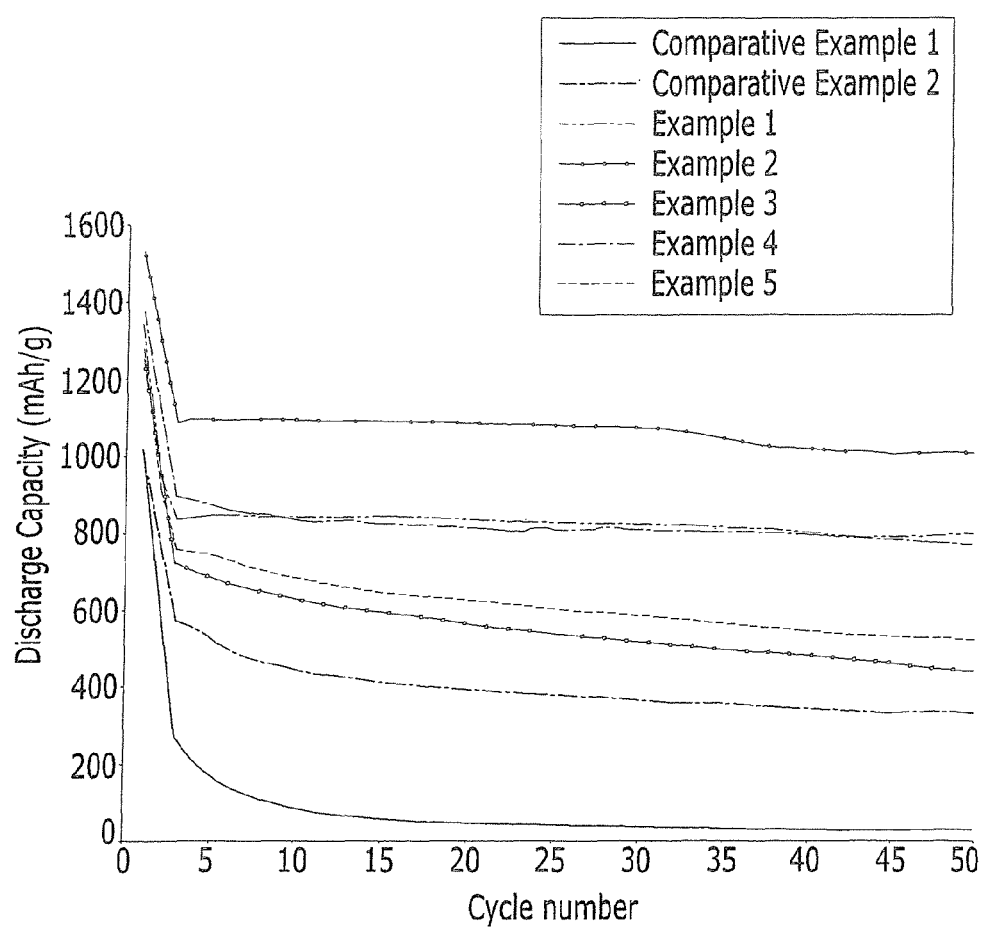
FIG. 10 is a graph comparing the cycle life characteristics of the rechargeable lithium battery cells prepared according to Examples 1 through 5 and Comparative Examples 1 and 2.

The cycle-life characteristics of the rechargeable lithium battery cells were estimated by charging/discharging the rechargeable lithium battery cells at 25° C. with 0.5 C 50 times, and the results are shown in FIG. 10. The first cycle efficiency was calculated and is shown in the following Table 2.

TABLE 2

|  | Charge quantity [mAh/g] | 1st cycle efficiency (%) |
|---|---|---|
| Example 1 | 2290 | 63.2 |
| Example 2 | 2246 | 67.0 |
| Example 3 | 2368 | 57.8 |
| Example 4 | 2281 | 65.4 |
| Example 5 | 2311 | 60.3 |
| Comparative Example 1 | 2099 | 52.7 |
| Comparative Example 2 | 2210 | 59.3 |

While the present invention has been illustrated and described in connection with certain exemplary embodiments, it is understood by those of ordinary skill in the art that various modifications may be made to the described embodiments without departing from the spirit and scope of the present invention, as defined in the following claims.

What is claimed is:

1. A negative active material for a rechargeable lithium battery, comprising a plurality of silicon oxide particles, each silicon oxide particle having a Si phase and an O phase, wherein:
   each silicon oxide particle comprises an atomic percentage of the Si phase that decreases in a concentration gradient from a larger atomic percentage of the Si phase at a surface of the silicon oxide particle to a smaller atomic percentage of the Si phase towards a center of the particle;
   each silicon oxide particle comprises an atomic percentage of the O phase that increases in a concentration gradient from a smaller atomic percentage of the O phase at a surface of the silicon oxide particle to a larger atomic percentage of the O phase towards the center of the silicon oxide particle; and
   a distance between the surface of the silicon oxide particle and a depth at which the atomic percentage of the Si phase is 55 atomic % is about 2% to about 20% of a particle diameter of the silicon oxide particle.

2. The negative active material of claim 1, wherein the atomic percentage of the Si phase is higher than the atomic percentage of the O phase at the surface of each silicon oxide particle.

3. The negative active material of claim 1, wherein in a graph of the atomic percentage of the Si phase according to depth from the surface of the silicon oxide particle, an integral value of the atomic percentage of the Si phase from the surface of the silicon oxide particle to a depth at which the atomic percentage of the Si phase is 55 atomic % is about 5,000 to about 40,000 nm·atomic %.

4. The negative active material of claim 1, wherein a distance between the surface of the silicon oxide particle and a depth at which the atomic percentage of the Si phase is 55 atomic % is about 6% to about 12% of a particle diameter of the silicon oxide particle.

5. The negative active material of claim 1, wherein a distance between the surface of the silicon oxide particle and a depth at which the atomic percentage of the Si phase is 55 atomic % is about 100 nm to about 1000 nm.

6. The negative active material of claim 1, wherein the silicon oxide particles include crystalline Si and non-crystalline silicon oxide and the concentration of crystalline Si is increased towards the surface of the particle.

7. The negative active material of claim 1, wherein the silicon oxide particles are porous.

8. The negative active material of claim 1, wherein the silicon oxide particles have a specific surface area of about 10 $m^2/g$ to about 500 $m^2/g$.

9. The negative active material of claim 1, wherein the silicon oxide particles comprise an amount of the Si phase and an amount of the O phase satisfying $SiO_x$ in which x is about 0.5 to about 1.5.

10. The negative active material of claim 1, further comprising a material selected from the group consisting of alkali metals, alkaline-earth metals, Group 13 through Group 16 elements, transition elements, rare earth elements, and combinations thereof.

11. The negative active material of claim 1, wherein the silicon oxide particles have an average particle diameter of about 0.1 μm to about 100 μm.

12. A lithium rechargeable battery, comprising:
a negative electrode comprising the negative active material of claim 1;
a positive electrode comprising a positive active material; and
an electrolyte.

13. A method of manufacturing the negative active material of claim 1, the method comprising:
heat treating a silicon oxide material in an inert atmosphere to prepare silicon oxide particles comprising a crystalline Si phase and a silicon oxide phase;
dispersing the silicon oxide particles in a first solvent to prepare a mixed solution; and
adding an etchant to the mixed solution.

14. The method of claim 13, wherein the silicon oxide material comprises a SiO powder.

15. The method of claim 13, wherein the heat treating is performed at a temperature of about 800 to about 1300° C.

16. The method of claim 13, wherein the first solvent comprises an aqueous solution.

17. The method of claim 13, wherein a molar ratio of the silicon oxide particles to the etchant in the mixed solution is about 10:1 to about 1:10.

18. The method of claim 13, wherein the etchant is added to the mixed solution at a flow rate of about 0.05 ml/min to about 5 ml/min.

19. The method of claim 13, wherein the etchant comprises an acid or a material comprising at least one F atom.

20. The method of claim 13, wherein the etchant comprises an etchant solution comprising an etchant material and a second solvent, wherein a volume ratio of a sum of a volume of the first solvent and a volume of the second solvent to a volume of the etchant material is about 1:1 to about 30:1.

21. The method of claim 20, wherein the etchant solution is a first solution comprising an etchant material having at least one F atom and having a concentration of the etchant material in the etchant solution of about 0.5M to about 12M, or a second solution having an etching speed substantially the same as an etching speed of the first solution.

* * * * *